United States Patent
Okamoto et al.

(10) Patent No.: US 9,441,521 B2
(45) Date of Patent: Sep. 13, 2016

(54) METHOD FOR REMOVING FOREIGN MATTER FROM A SELECTIVE REDUCTION CATALYST SYSTEM

(75) Inventors: Yasuo Okamoto, Fujisawa (JP); Yuuta Kageyama, Sagamihara (JP); Koji Sakumoto, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 257 days.

(21) Appl. No.: 14/346,222

(22) PCT Filed: Aug. 23, 2012

(86) PCT No.: PCT/JP2012/071322
§ 371 (c)(1),
(2), (4) Date: Mar. 20, 2014

(87) PCT Pub. No.: WO2013/047032
PCT Pub. Date: Apr. 4, 2013

(65) Prior Publication Data
US 2014/0227138 A1    Aug. 14, 2014

(30) Foreign Application Priority Data

Sep. 28, 2011  (JP) .................................. 2011-212944

(51) Int. Cl.
*F01N 3/18* (2006.01)
*F01N 3/20* (2006.01)
(Continued)

(52) U.S. Cl.
CPC .............. *F01N 3/2093* (2013.01); *F01N 3/208* (2013.01); *F01N 11/00* (2013.01); *F01N 3/021* (2013.01); *F01N 3/106* (2013.01); *F01N 13/009* (2014.06); *F01N 2550/05* (2013.01); *F01N 2560/026* (2013.01); *F01N 2560/06* (2013.01); *F01N 2560/14* (2013.01); *F01N 2610/02* (2013.01); *F01N 2610/11* (2013.01); *F01N 2610/148* (2013.01); *F01N 2610/1473* (2013.01); *F01N 2610/1493* (2013.01); *F01N 2900/1808* (2013.01); *F01N 2900/1811* (2013.01);
(Continued)

(58) Field of Classification Search
CPC ..................................................... F01N 3/2066
See application file for complete search history.

(56) References Cited

U.S. PATENT DOCUMENTS 5,605,042 A * 2/1997 Stutzenberger .... B01D 53/9431
60/286
7,497,077 B2 * 3/2009 Dodge ................. F01N 3/2066
239/406

(Continued)

FOREIGN PATENT DOCUMENTS

CN    100540858 C  *  9/2009  ............. B01D 53/90
CN    105026711 A  *  11/2015  ........... F01N 3/2066
(Continued)

OTHER PUBLICATIONS

Patent Abstracts of Japan, Publication No. 2003-222019, Published Aug. 8, 2003.
(Continued)

*Primary Examiner* — Timothy Vanoy
(74) *Attorney, Agent, or Firm* — Staas & Halsey LLP (57) ABSTRACT

A method and a selective-reduction catalyst system to remove foreign matter which may cause closure of a urea water path of a supply module and therearound. A urea water pressure is changed in the urea water path to remove the foreign matter.

16 Claims, 7 Drawing Sheets

(51) Int. Cl.
*F01N 11/00* (2006.01)
*F01N 3/10* (2006.01)
*F01N 3/021* (2006.01)
*F01N 13/00* (2010.01)

(52) U.S. Cl.
CPC ............ *F01N2900/1814* (2013.01); *F01N 2900/1818* (2013.01); *Y02T 10/24* (2013.01); *Y02T 10/47* (2013.01)

(56) References Cited

U.S. PATENT DOCUMENTS

| | | | | |
|---|---|---|---|---|
| 7,743,603 | B2* | 6/2010 | Nishina | B01D 53/90 60/286 |
| 8,371,113 | B2* | 2/2013 | Jochumsen | F01N 3/2066 239/411 |
| 2007/0186542 | A1* | 8/2007 | Hirata | B01D 53/90 60/286 |
| 2008/0282681 | A1* | 11/2008 | Katou | B01D 53/9409 60/286 |
| 2011/0099983 | A1* | 5/2011 | Ohno | F01N 3/2066 60/277 |
| 2012/0219485 | A1* | 8/2012 | Sebelius | F01N 3/2066 423/235 |
| 2013/0180323 | A1* | 7/2013 | Peucat | F01N 3/2066 73/114.75 |

FOREIGN PATENT DOCUMENTS

| | | | |
|---|---|---|---|
| EP | 1 331 373 | 7/2003 | |
| EP | 2 034 147 | 3/2009 | |
| JP | 2000-303826 | 10/2000 | |
| JP | 2003-222019 | 8/2003 | |
| JP | 2005-276578 | 10/2005 | |
| JP | 2008-121594 | 5/2008 | |
| JP | 2012-82819 | 4/2012 | |
| WO | WO 2006048977 A1 * | 5/2006 | ............ B01D 53/90 |

OTHER PUBLICATIONS

Patent Abstracts of Japan, Publication No. 2008-121594, Published May 29, 2008.
Patent Abstracts of Japan, Publication No. 2005-276578, Published Oct. 6, 2008.
Patent Abstracts of Japan, Publication No. 2000-303836, Published Oct. 31, 2000.
Patent Abstracts of Japan, Publication No. 2012-082819, Published Apr. 26, 2012.
International Search Report issued on Oct. 16, 2012 in corresponding International Application No. PCT/JP2012/071322.
Extended European Search Report mailed Apr. 22, 2015 in corresponding European Application No. 12834940.4.
Written Opinion of the International Searching Authority mailed Oct. 16, 2012 in corresponding International Application No. PCT/JP2012/071322.

* cited by examiner

METHOD FOR REMOVING FOREIGN MATTER FROM A SELECTIVE REDUCTION CATALYST SYSTEM

CROSS-REFERENCE TO RELATED APPLICATIONS

This application claims the foreign priority benefit of Japanese Patent Application No. 2011-212944 filed Sep. 28, 2011, the contents of which are incorporated herein by reference, which serves as priority for PCT Application No. PCT/JP2012/071322 filed Aug. 23, 2012.

TECHNICAL FIELD

The present invention relates to a method for removing a foreign matter and a selective-reduction catalyst system for removing a foreign matter which may cause closure, in order to solve or previously prevent closure of a urea water path in a selective-reduction catalyst system.

BACKGROUND ART

A selective-reduction catalyst system using a selective-reduction catalyst has been developed as an exhaust gas aftertreatment system for purifying NOx in an exhaust gas of a diesel engine.

This selective-reduction catalyst system provides urea water accumulated in a urea tank to the upstream of exhaust gas with respect to the selective-reduction catalyst, and generates ammonia with the heat of the exhaust gas, and reduces NOx with the selective-reduction catalyst using this ammonia and purifies the exhaust gas (for example, see Patent Document 1). The urea water is injected from a dosing valve provided at the upstream side with respect to the selective-reduction catalyst, so that the urea water is provided to the upstream of the exhaust gas with respect to the selective-reduction catalyst.

The urea water is provided to the dosing valve by using a supply module (SM) having a supply module pump (SM pump), a urea water pressure sensor, and the like. The supply module is connected via a liquid feeding line to the urea tank, and provides the urea water, which has been sucked from the urea tank via the liquid feeding line, to the dosing valve via a compression feeding line connecting the supply module and the dosing valve. At this occasion, a measurement value of a urea water pressure sensor of the supply module is feedback controlled so as to attain a constant level, and when the urea water pressure becomes constant, the urea water is started to be injected.

PRIOR ART DOCUMENTS

Patent Document 1: Japanese Patent Application Publication No. 2000-303826

However, when the urea water path of the supply module and therearound is closed by foreign matter such as solid matter of crystallized urea water and dust particles mixed into the urea water, the urea water pressure abnormally increases, which makes it impossible to appropriately control the urea water pressure, and the injection of the urea water cannot be started. As a result, the NOx in the exhaust gas cannot be appropriately purified.

When such malfunction occurs, a malfunction indicator lamp (MIL) is turned on to notify the driver of occurrence of the abnormality. Accordingly, the driver recognizes malfunction of the vehicle, and asks the manufacturer and the like to repair the vehicle on the basis of the indication of the malfunction indicator lamp. However, the closure of the urea water path can be easily solved in many cases by the control performed by the vehicle, and if a warning is always given to the driver whenever the urea water path is closed, the driver has to have the vehicle repaired no matter whether it can be easily solved by the control of the vehicle, and it is totally impossible for the driver to put up with the cumbersomeness.

SUMMARY OF THE INVENTION

Accordingly, it is an object of the present invention to provide a method for removing a foreign matter and a selective-reduction catalyst system for removing a foreign matter which may cause closure of a urea water path of a supply module and therearound and solve or previously prevent closure of the urea water path, and is capable of reducing the burden imposed on the driver at the same time.

Means for Solving the Problems

The present invention made to achieve the above object is a method for removing a foreign matter, which changes a urea water pressure in a urea water path of a selective-reduction catalyst system for purifying NOx in an exhaust gas by providing a urea water to a selective-reduction catalyst.

The urea water pressure in the urea water path is preferably changed by repeatedly increasing and decreasing the urea water pressure in the urea water path for a specified number of times.

The urea water pressure in the urea water path is preferably changed before the urea water pressure is increased after an ignition is turned on.

The urea water pressure in the urea water path is preferably changed before the urea water is drained from a compression feeding line of the urea water path after the ignition is turned off.

The urea water pressure in the urea water path is preferably changed when the urea water pressure becomes more than an abnormality threshold value.

Further, the present invention is a selective-reduction catalyst system including: a selective-reduction catalyst connected to an exhaust pipe; a dosing valve for injecting a urea water at an upstream-side of the selective-reduction catalyst; a supply module for sucking the urea water in a urea tank and providing the urea water to the dosing valve, and returning surplus urea water back to the urea tank; and a dosing control module for controlling the dosing valve and the supply module, wherein the dosing control module is configured to execute a foreign matter removing mode for changing a urea water pressure in a urea water path of the selective-reduction catalyst system.

The dosing control module preferably changes the urea water pressure in the urea water path by repeating increase and decrease of the urea water pressure in the urea water path for the number of times specified.

The dosing control module preferably executes the foreign matter removing mode before the urea water pressure is increased after an ignition is turned on.

The dosing control module preferably executes the foreign matter removing mode before the urea water is drained from a compression feeding line of the urea water path after the ignition is turned off.

The dosing control module preferably executes the foreign matter removing mode when the urea water pressure is more than an abnormality threshold value.

According to the present invention, foreign matter which may cause closure of a urea water path of a supply module and therearound is removed to solve or previously prevent closure of the urea water path, and the burden imposed on the driver can be reduced at the same time.

DESCRIPTION OF EMBODIMENTS

Preferred embodiments of the present invention will be hereinafter explained with reference to appended drawings.

First, a selective-reduction catalyst system provided in a vehicle will be explained.

Figure 1:
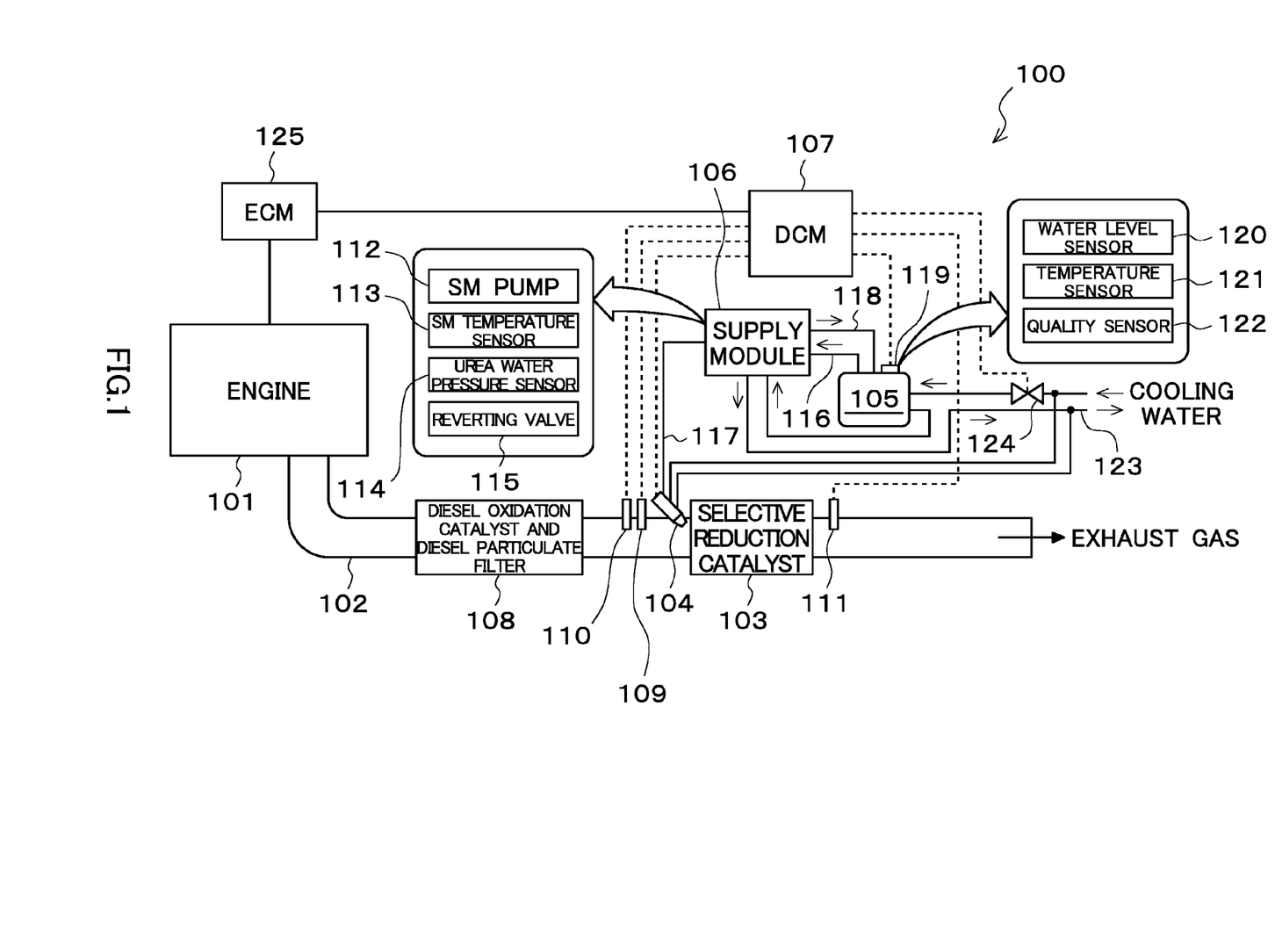
FIG. 1 is a schematic diagram illustrating an example of a selective-reduction catalyst system to which the present invention is applied.

As illustrated in FIG. 1, a selective-reduction catalyst system 100 includes a selective-reduction catalyst 103 connected to an exhaust pipe 102 of an engine 101, a dosing valve 104 for injecting urea water at the upstream-side of the selective-reduction catalyst 103 (the upstream-side of the exhaust gas), a urea tank 105 for accumulating the urea water, a supply module (SM) 106 for sucking the urea water in the urea tank 105 and providing the urea water to the dosing valve 104 and returning surplus urea water back into the urea tank 105, and a dosing control module (DCM) 107 for controlling the dosing valve 104, the supply module 106, and the like.

A diesel oxidation catalyst (DOC) and diesel particulate filter (DPF) 108 and the selective-reduction catalyst 103 are arranged in order from the upstream-side to the downstream-side of the exhaust gas in the exhaust pipe 102 of the engine 101. The diesel oxidation catalyst is to oxidize NO in the exhaust gas from the engine 101 to make it into NO2, and controlling the ratio of NO and NO2 in the exhaust gas, thus enhancing the denitrating efficiency in the selective-reduction catalyst 103. On the other hand, the diesel particulate filter is to collect particulate matter (PM) in the exhaust gas.

The dosing valve 104 has an injection hole provided in a cylinder filled with high pressure urea water, and has such a structure that a valve plug filling the injection hole is attached to a cylindrical plunger having a slit, and by energizing a coil, the plunger is pulled up, whereby the valve plug is moved away from the injection hole, so that the urea water is injected. A spring for urging the valve plug into closed state at all times via the plunger is provided inside of the dosing valve 104, and therefore, when the coil is no longer energized, the plunger is pulled down by the spring force, and the valve plug fills the injection hole, so that the injection of the urea water is stopped.

An exhaust temperature sensor 109 for measuring the temperature (selective-reduction catalyst entrance temperature) of the exhaust gas at the entrance of the selective-reduction catalyst 103 is provided in the exhaust pipe 102 at the upstream-side of the dosing valve 104. An upstream-side NOx sensor 110 for detecting the NOx concentration at the upstream-side of the selective-reduction catalyst 103 is provided at the upstream-side of the selective-reduction catalyst 103 (in this case, at the upstream-side of the exhaust temperature sensor 109). A downstream-side NOx sensor 111 for detecting the NOx concentration at the downstream-side of the selective-reduction catalyst 103 is provided at the downstream-side of the selective-reduction catalyst 103.

The supply module 106 includes a supply module pump (SM pump) 112 for feeding the urea water with pressure, a supply module temperature sensor (SM temperature sensor) 113 for measuring the temperature of the supply module 106 (the temperature of the urea water flowing in the supply module 106), a urea water pressure sensor 114 for measuring the pressure of the urea water in the supply module 106 (the pressure at the discharge-side of the supply module pump 112), and a reverting valve 115 for switching the flow channel of the urea water to switch whether the urea water from the urea tank 105 is provided to the dosing valve 104 or the urea water in the dosing valve 104 is returned back to the urea tank 105. In this case, when the reverting valve 115 is in the OFF state, the urea water from the urea tank 105 is provided to the dosing valve 104, and when the reverting valve 115 is in the ON state, the urea water in the dosing valve 104 is returned back to the urea tank 105.

When the reverting valve 115 is switched so that the urea water is provided to the dosing valve 104, the supply module 106 uses the supply module pump 112 to suck the urea water in the urea tank 105 via a liquid feeding line (suction line) 116, and provides the urea water to the dosing valve 104 via a compression feeding line (pressure line) 117, and surplus urea water is returned back to the urea tank 105 via a collection line (after line) 118.

In the urea tank 105, a selective-reduction catalyst sensor 119 is provided. The selective-reduction catalyst sensor 119 includes a water level sensor 120 for measuring the water level of the urea water in the urea tank 105, a temperature sensor 121 for measuring the temperature of the urea water in the urea tank 105, and a quality sensor 122 for measuring the quality of the urea water in the urea tank 105. For example, the quality sensor 122 determines the concentration of the urea water and as to whether different types of mixtures are mixed in the urea water on the basis of the electric conductivity and the propagation speed of the ultrasonic wave, thus detecting the quality of the urea water in the urea tank 105.

The urea tank 105 and the supply module 106 are connected to a cooling line 123 for circulating cooling water for cooling the engine 101. The cooling line 123 passes through the urea tank 105, and heat exchange is performed between the cooling water flowing through the cooling line 123 and the urea water in the urea tank 105. Likewise, the cooling line 123 passes through the supply module 106, and heat exchange is performed between the cooling water flowing through the cooling line 123 and the urea water in the supply module 106.

The cooling line 123 is provided with a tank heater valve (coolant valve) 124 for switching whether cooling water is provided to the urea tank 105 and the supply module 106. It should be noted that the cooling line 123 is also connected to the dosing valve 104, but regardless of whether the tank heater valve 124 is open or closed, the cooling water is configured to be provided to the dosing valve 104. FIG. 1 is simplified, and although not shown in FIG. 1, the cooling line 123 is arranged along the liquid feeding line 116 in which the urea water passes, the compression feeding line 117, and the collection line 118.

Figure 2:
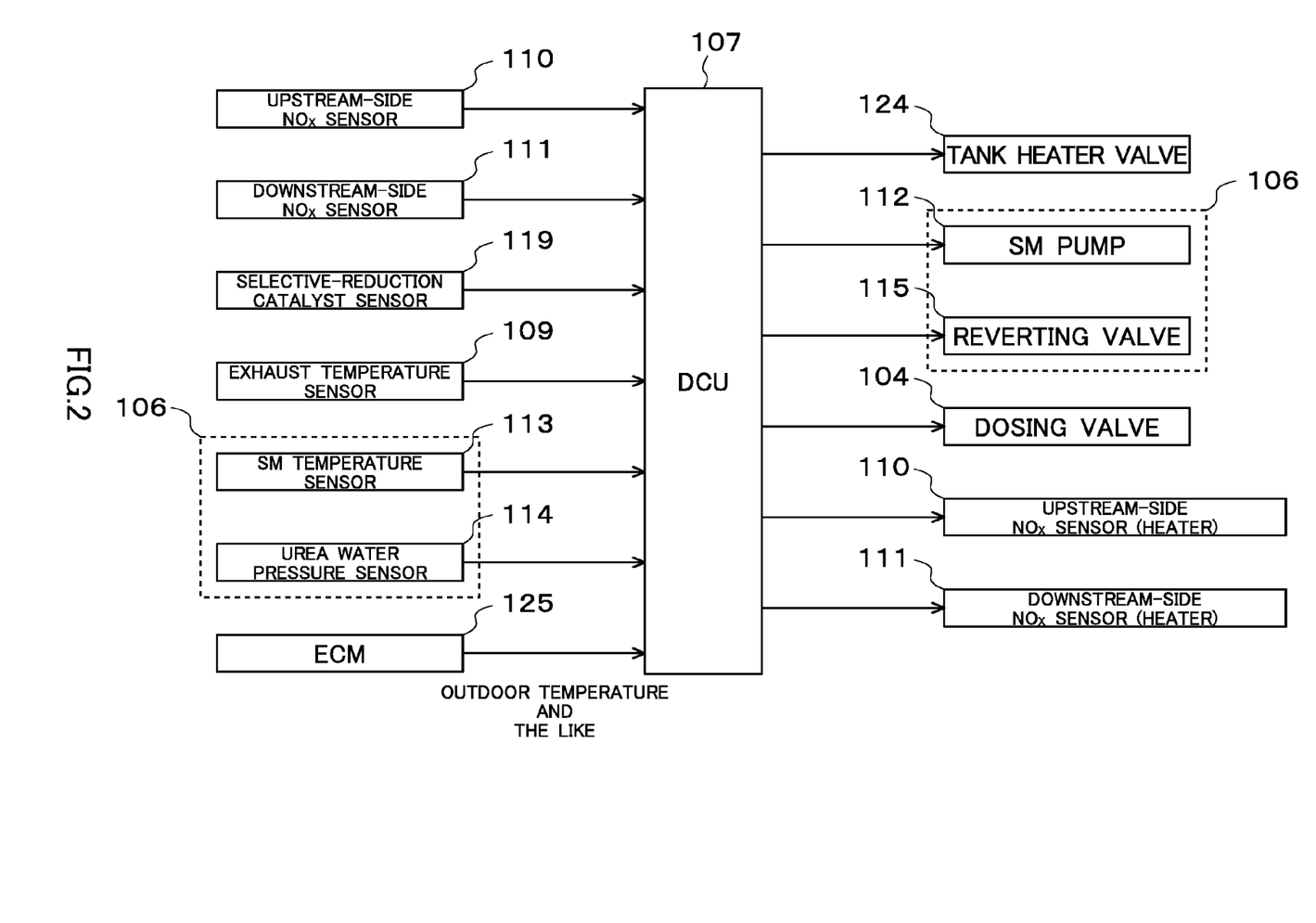
FIG. 2 is a figure illustrating input/output configuration of a dosing control module.

Subsequently, input/output configuration of the dosing control module 107 will be explained.

As shown in FIG. 2, the dosing control module 107 is connected to input signal lines connected from the upstream-side NOx sensor 110, the downstream-side NOx sensor 111, the selective-reduction catalyst sensor 119 (the water level sensor 120, the temperature sensor 121, and the quality sensor 122), the exhaust temperature sensor 109, the supply module temperature sensor 113 and the urea water pressure sensor 114 of the supply module 106, and the engine control module (ECM) 125 controlling the engine 101. Signals of the outdoor temperature, the engine parameters (the engine rotation speed and the like) are input from the engine control module 125.

The dosing control module 107 is connected to output signal lines connected to the tank heater valve 124, the supply module pump 112 and the reverting valve 115 of the supply module 106, the dosing valve 104, the heater of the upstream-side NOx sensor 110, and the heater of the downstream-side NOx sensor 111. It should be noted that input/output of signals between the dosing control module 107 and each device may be either an input/output via individual signal lines or an input/output via controller area network (CAN).

The dosing control module 107 estimates the amount of NOx in the exhaust gas on the basis of the signals of the engine parameters given by the engine control module 125 and the exhaust gas temperature given by the exhaust temperature sensor 109, and determines the amount of urea water injected from the dosing valve 104 on the basis of the amount of NOx in the exhaust gas estimated, and further, when the amount of urea water determined is injected from the dosing valve 104, the dosing valve 104 is controlled to adjust the amount of urea water injected from the dosing valve 104, on the basis of the detection value of the upstream-side NOx sensor 110.

The selective-reduction catalyst system 100 according to the present embodiment employs the method for removing foreign matter for changing the urea water pressure (the measurement value of the urea water pressure sensor 114) in the urea water path and remove the foreign matter which closes the urea water path in order to solve or previously prevent the closure of the urea water path in the selective-reduction catalyst system 100 for purifying NOx in the exhaust gas by providing the urea water to the selective-reduction catalyst 103.

For example, the urea water path denotes a path in which the urea water flows in the supply module 106 and therearound, but the urea water path is not limited thereto: the urea water path includes other paths in which the urea water flows.

This method for removing foreign matter can be realized by a foreign matter removing mode which is one of the modes which is embodied in the dosing control module 107. Therefore, the dosing control module 107 according to the present embodiment is configured to execute the foreign matter removing mode for changing the urea water pressure in the urea water path by controlling the supply module 106 and removing the foreign matters which closes the urea water path in order to solve or previously prevent the closure of the urea water path in the supply module 106.

Figure 3:
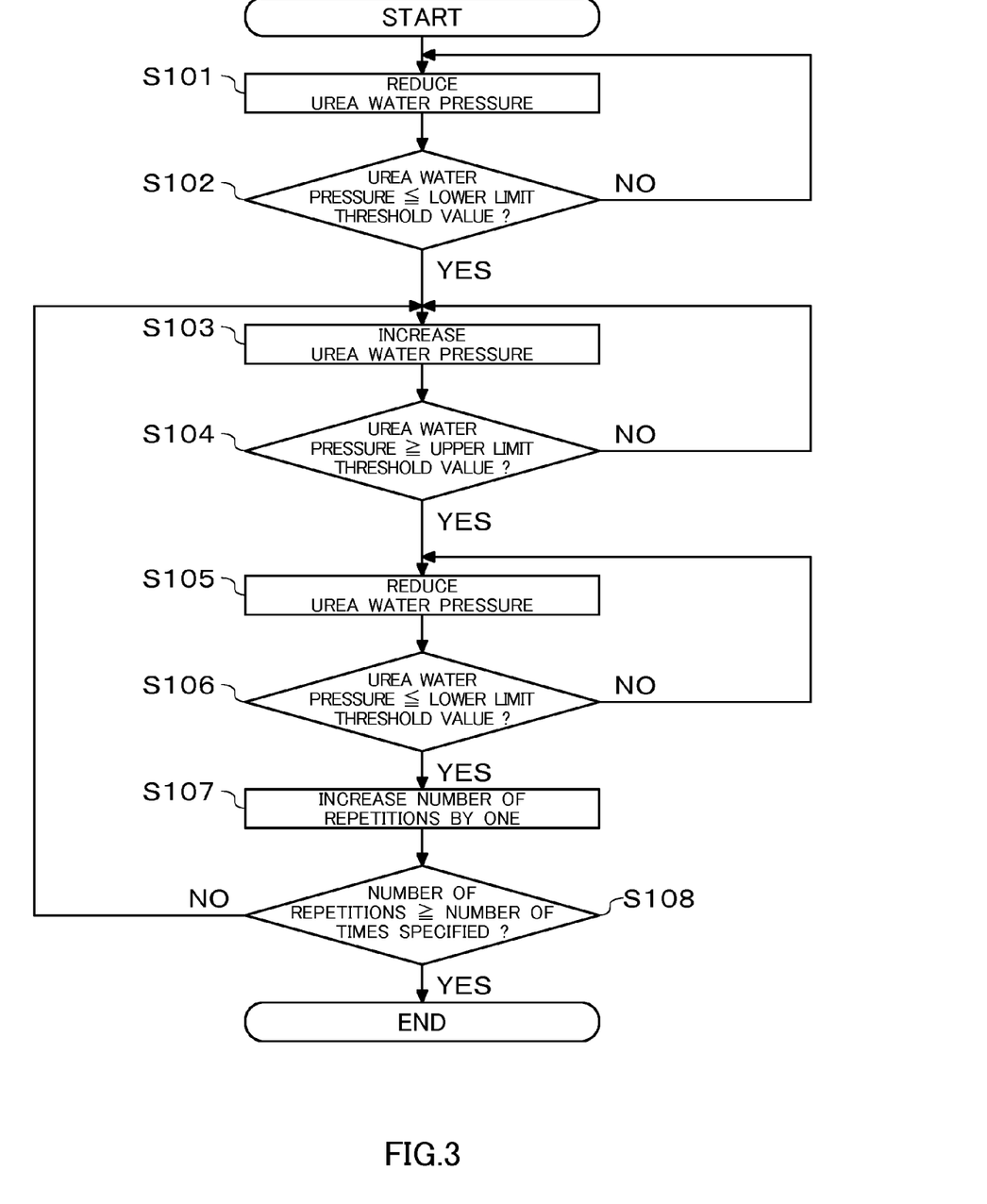
FIG. 3 is a flowchart illustrating an operation flow in a foreign matter removing mode according to the present invention.

As shown in FIG. 3, the foreign matter removing mode includes step S101 of reducing the urea water pressure, step S102 of determining whether the urea water pressure is equal to or less than a lower limit threshold value which has been configured in advance, step S103 of increasing the urea water pressure, step S104 for determining whether the urea water pressure is equal to or more than the upper limit threshold value that has been configured in advance, step S105 of reducing the urea water pressure, step S106 of determining whether the urea water pressure is equal to or less than the lower limit threshold value that has been configured in advance, step S107 of increasing the number of repetitions by one, and step S108 of determining whether the number of repetitions is equal to or more than the number of times specified that has been set in advance.

In step S101, the dosing control module 107 controls the supply module 106, and reduces the urea water pressure in the urea water path. This step S101 is repeated until the urea water pressure is determined to be equal to or less than the lower limit threshold value that has been configured in advance in step S102.

In step S103, the dosing control module 107 controls the supply module 106 to increase the urea water pressure in the urea water path. This step S103 is repeated until the urea water pressure is determined to be equal to or more than the upper limit threshold value that has been configured in advance in step S104.

In step S105, the dosing control module 107 controls the supply module 106 and reduces the urea water pressure in the urea water path. This step S105 is repeated until the urea water pressure is determined to be equal to or less than the lower limit threshold value that has been configured in advance in step S106.

In step S107 and step S108, the number of repetitions for which the above series of operations is performed is counted, and steps S101 to S108 are repeated until the number of repetitions becomes the same as the number of times specified that has been configured in advance.

As described above, the dosing control module 107 controls the supply module 106 and repeats the increase and the decrease of the urea water pressure in the urea water path for the number of times specified in the foreign matter removing mode, whereby the foreign matters are removed by changing the urea water pressure in the urea water path.

The times when the dosing control module 107 executes the foreign matter removing mode is not particularly limited, but the following times may be considered.

(1) The dosing control module 107 controls the supply module 106 and fills the urea water into the compression feeding line 117 connecting the supply module 106 and the dosing valve 104, and thereafter, executes the foreign matter removing mode before the urea water pressure is increased.

(2) The dosing control module 107 executes the foreign matter removing mode immediately after the ignition OFF.

(3) When the supply module 106 is feedback controlled in order to maintain the urea water pressure at a constant level, the dosing control module 107 executes the foreign matter removing mode when the urea water pressure is more than an abnormality threshold value. In this case, the abnormality threshold value means a threshold value which is a reference with which the dosing control module 107 determines whether some kind of abnormality occurs on the basis of abnormal increase of the urea water pressure.

These may be executed independently, or may be executed in a complex manner. In the explanation below, foreign matter removing modes 1 to 3 mean the foreign matter removing mode executed at the times (1) to (3), respectively.

Figure 4:
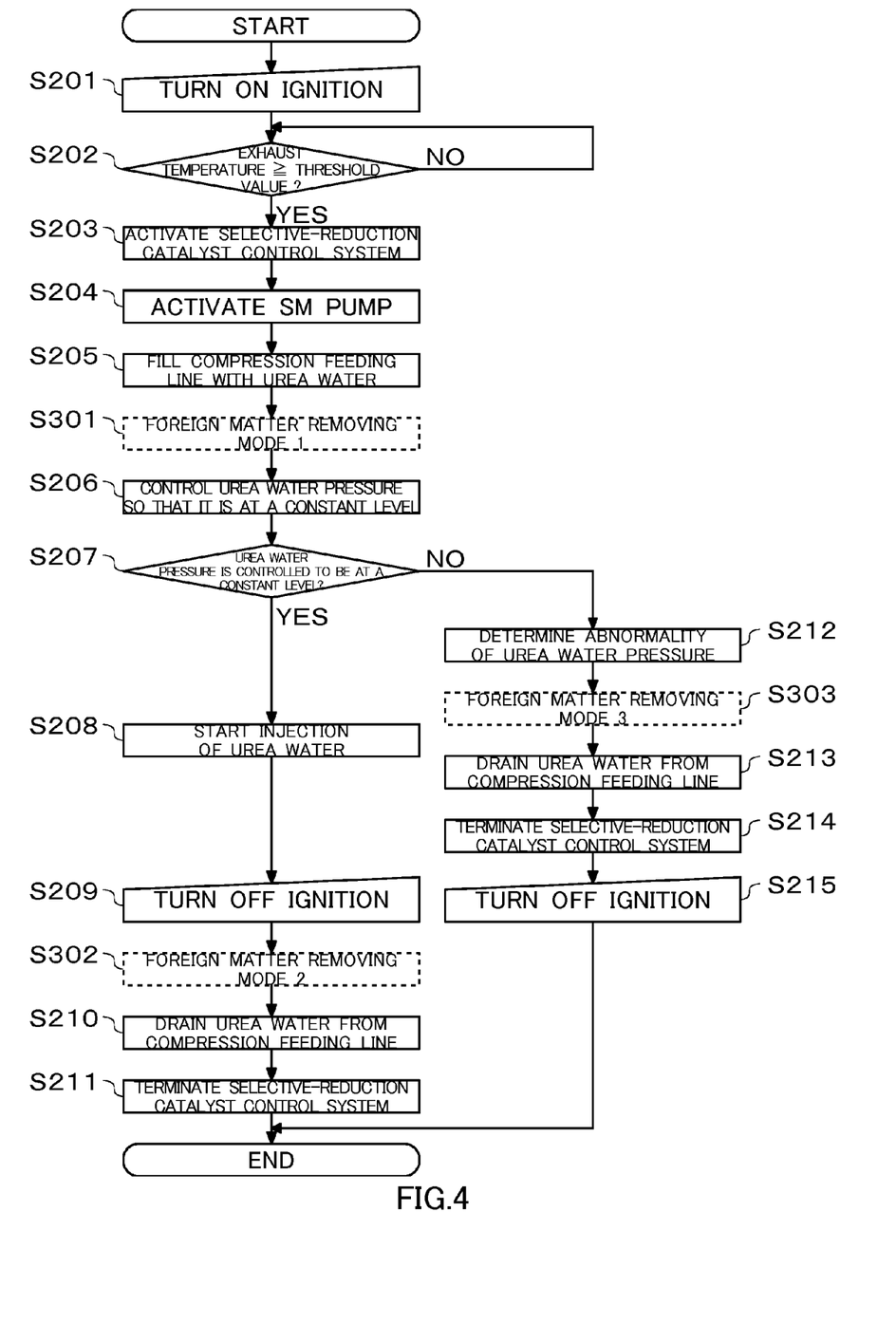
FIG. 4 is a flowchart illustrating an operation flow of a selective-reduction catalyst system according to the present invention.

As shown in FIG. 4, normal operation mode of the selective-reduction catalyst system 100 includes step S201 in which the driver turns ON the ignition, step S202 of determining whether the exhaust temperature is equal to or more than a threshold value that has been configured in advance, step S203 of activating a selective-reduction catalyst control system, step S204 of activating the supply module pump 112, a step S205 of filling the compression feeding line 117 with the urea water, step S206 of increasing the urea water pressure, step S207 of determining whether the urea water pressure is controlled to be at a constant level, step S208 of starting injection of the urea water, step S209 in which the driver turns OFF the ignition, step S210 of draining the urea water from the compression feeding line 117, step S211 of terminating (shutting down) the selective-reduction catalyst control system, step S212 of determining the abnormality of the urea water pressure, step S213 of draining the urea water from the compression feeding line 117, step S214 of terminating the selective-reduction catalyst control system, and step S215 in which the driver turns OFF the ignition.

In step S202, the selective-reduction catalyst system 100 waits from when the ignition is turned ON in step S201 to when the exhaust temperature becomes equal to or more than the threshold value that has been configured in advance.

In step S203, the engine control module 125 controls the dosing control module 107 and activates the selective-reduction catalyst control system.

In step S204 and step S205, the dosing control module 107 controls the supply module 106 and activates the supply module pump 112, and fills the compression feeding line 117 with the urea water.

In step S206, the dosing control module 107 controls the supply module 106 and increases the urea water pressure, and controls the supply module 106 with feedback control so that the urea water pressure maintains a constant level at a specified value.

In step S207, a determination is made as to whether the urea water pressure is at a constant level at a specified value, and when the urea water pressure is at a constant level at a specified value, step S208 is subsequently performed. If not, step S212 is subsequently performed.

In step S208, the dosing control module 107 controls the dosing valve 104 and the supply module 106, and starts injection of the urea water.

In step S210, after the driver finishes driving and turns OFF the ignition in step S209, the dosing control module 107 controls the supply module 106 and drains the urea water from the compression feeding line 117.

In step S211, the engine control module 125 controls the dosing control module 107, and terminates the selective-reduction catalyst control system.

On the other hand, in step S212, when the urea water pressure is more than the abnormality threshold value, occurrence of certain abnormality is detected, and the abnormality of the urea water pressure is determined.

In step S213, the dosing control module 107 controls the supply module 106 and drains the urea water from the compression feeding line 117.

In step S214, the engine control module 125 controls the dosing control module 107 and terminates the selective-reduction catalyst control system, and waits until the driver finishes driving and turns OFF the ignition in step S215.

One driving cycle in the normal operation mode is constituted by steps S201 to S215 explained above.

Figure 5:
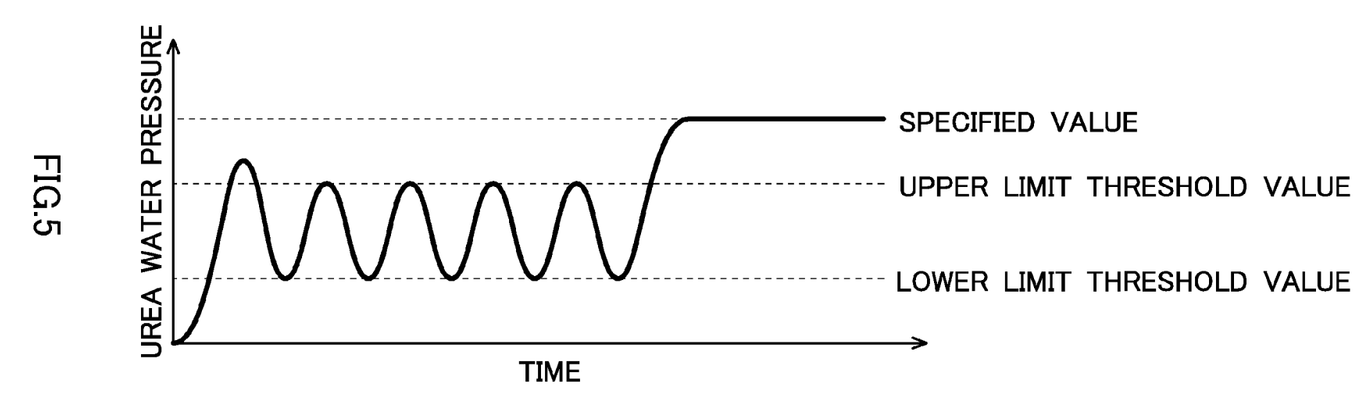
FIG. 5 is a figure illustrating relationship between urea water pressure and time in foreign matter removing mode 1.

In this one driving cycle, the foreign matter removing mode 1 is executed after step S205. The transition of the urea water pressure at this occasion is what is shown in FIG. 5, and after the compression feeding line 117 is filled with the urea water, the urea water pressure is reduced, and the increase and the decrease of the urea water pressure are repeated, and thereafter, the urea water pressure is controlled to be at a constant level at a specified value, and then, normal operation is performed.

Figure 6:
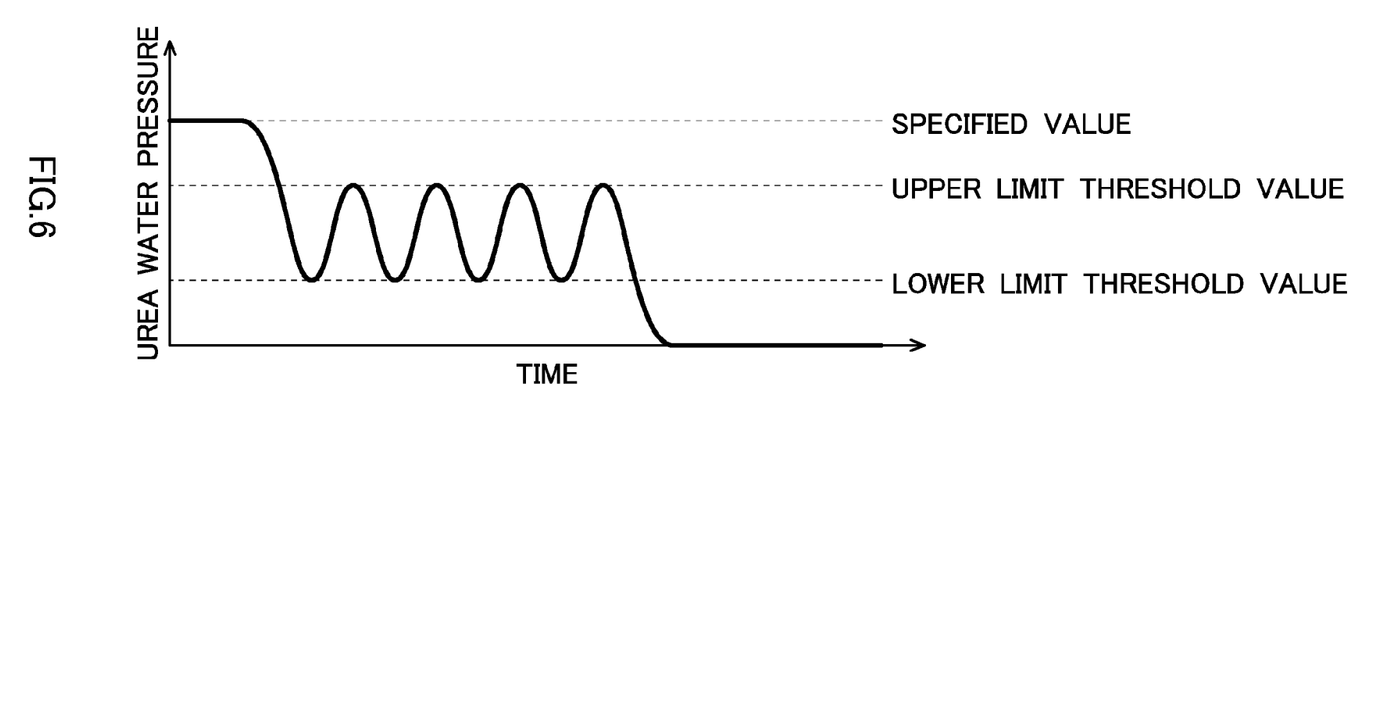
FIG. 6 is a figure illustrating relationship between urea water pressure and time in foreign matter removing mode 2.

The foreign matter removing mode 2 is executed after step S209. The transition of the urea water pressure at this occasion is what is shown in FIG. 6, and in the state in which the urea water pressure is controlled to be at a constant level at a specified value, the urea water pressure is reduced, and the increase and the decrease of the urea water pressure are repeated, and thereafter, the urea water is drained from the compression feeding line 117, and then the selective-reduction catalyst control system is terminated.

The foreign matter removing mode 1 and the foreign matter removing mode 2 are executed for the purpose of solving or previously preventing the closure of the urea water path regardless of whether the urea water path is closed or not.

Figure 7:
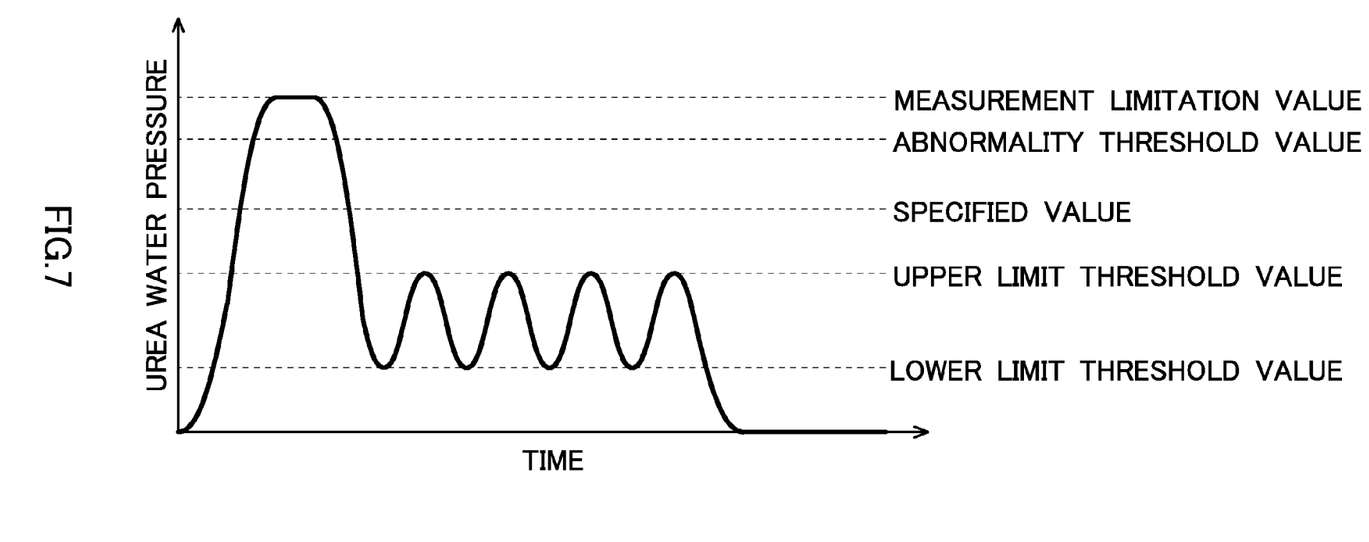
FIG. 7 is a figure illustrating relationship between urea water pressure and time in foreign matter removing mode 3.

On the other hand, the foreign matter removing mode 3 is executed after step S212. The transition of the urea water pressure at this occasion is what is shown in FIG. 7, and when the urea water pressure increases abnormally to become equal to or more than the abnormality threshold value, the urea water pressure is reduced, and the increase and the decrease of the urea water pressure are repeated, and thereafter, the urea water is drained from the compression feeding line 117, and the selective-reduction catalyst control system is terminated. The measurement limitation value in FIG. 7 means the limitation value of the urea water pressure that can be measured by the urea water pressure sensor 114. Depending on the urea water pressure sensor 114, it is impossible to measure a value equal to or more than that.

This foreign matter removing mode 3 is executed for the purpose of solving the closure of the urea water path after the urea water path is actually closed. If the closure of the urea water path cannot be solved even though the ignition ON and the ignition OFF are repeated several times and the foreign matter removing mode 3 is executed several times, the malfunction indicator lamp is turned on, and the driver may be notified of the abnormality. Accordingly, the driver can find that the malfunction can be easily solved by the control performed by the vehicle, and this can prevent such situation that the driver is notified of the malfunction even though it is a malfunction that can be solved which imposes excessive burden on the driver.

As explained above, according to the present invention, foreign matter which may cause closure of the urea water path of the supply module and therearound is removed to solve or previously prevent the closure of the urea water path, and the burden imposed on the driver can be reduced at the same time.

The above embodiments are not intended to limit the operation flow of the foreign matter removing mode and the operation flow of the selective-reduction catalyst system. More specifically, various kinds of design changes can be made in such a scope that can embody the gist of the present invention.

The invention claimed is:

1. A method for removing foreign matter by changing a pressure of urea water in a urea water path of a selective-reduction catalyst system, comprising:
    detecting the urea water pressure in the urea water path,
    wherein, when a change is detected in the urea water pressure,
    providing the urea water to the urea water path at a higher pressure than an upper pressure limit; and
    thereafter repeatedly increasing and decreasing the urea water pressure in the urea water path to remove the foreign matter from the urea water path, during at least a portion of time after an engine ignition is either turned on or off, but prior to change over to an opposite ignition status.

2. The method according to claim 1, wherein the repeatedly increasing and decreasing the urea water pressure in the urea water path is for a specific number of times.

3. The method according to claim 2, wherein the urea water pressure in the urea water path is changed before the urea water pressure is increased after the ignition is turned on.

4. The method according to claim 3, wherein the urea water pressure in the urea water path is changed before the urea water is drained from a compression feeding line of the urea water path after the ignition is turned off.

5. The method according to claim 4, wherein the urea water pressure in the urea water path is changed when the urea water pressure becomes more than an abnormality threshold value.

6. The method according to claim 3, wherein the urea water pressure in the urea water path is changed when the urea water pressure becomes more than an abnormality threshold value.

7. The method according to claim 2, wherein the urea water pressure in the urea water path is changed before the urea water is drained from a compression feeding line of the urea water path after the ignition is turned off.

8. The method according to claim 7, wherein the urea water pressure in the urea water path is changed when the urea water pressure becomes more than an abnormality threshold value.

9. The method according to claim 2, wherein the urea water pressure in the urea water path is changed when the urea water pressure becomes more than an abnormality threshold value.

10. The method according to claim 1, wherein the urea water pressure in the urea water path is changed before the urea water pressure is increased after the ignition is turned on.

11. The method according to claim 10, wherein the urea water pressure in the urea water path is changed before the urea water is drained from a compression feeding line of the urea water path after the ignition is turned off.

12. The method according to claim 11, wherein the urea water pressure in the urea water path is changed when the urea water pressure becomes more than an abnormality threshold value.

13. The method according to claim 10, wherein the urea water pressure in the urea water path is changed when the urea water pressure becomes more than an abnormality threshold value.

14. The method according to claim 1, wherein the urea water pressure in the urea water path is changed before the urea water is drained from a compression feeding line of the urea water path after the ignition is turned off.

15. The method according to claim 14, wherein the urea water pressure in the urea water path is changed when the urea water pressure becomes more than an abnormality threshold value.

16. The method according to claim 1, wherein the urea water pressure in the urea water path is changed when the urea water pressure becomes more than an abnormality threshold value.

* * * * *